United States Patent [19]

Adams

[11] 3,974,431
[45] Aug. 10, 1976

[54] QUICK RESPONSE CIRCUIT FOR CONTROL OF A MACHINE TOOL APPARATUS

[75] Inventor: Lyle C. Adams, Maple Valley, Wash.

[73] Assignee: Macotech Corporation, Seattle, Wash.

[22] Filed: Oct. 2, 1974

[21] Appl. No.: 511,284

[52] U.S. Cl. .................................. 318/561; 318/39; 235/151.11
[51] Int. Cl.² ........................................ G05B 13/00
[58] Field of Search ............ 318/39, 571, 561, 620, 318/563; 235/151.11

[56] References Cited
UNITED STATES PATENTS

| | | | |
|---|---|---|---|
| 3,634,664 | 1/1972 | Volek | 318/561 |
| 3,746,955 | 7/1973 | Kobayashi | 318/561 |
| 3,784,798 | 1/1974 | Beadle et al. | 235/151.11 |
| 3,836,834 | 9/1974 | Abbatiello et al. | 318/563 |
| 3,849,712 | 11/1974 | Lankford et al. | 318/561 |
| 3,872,285 | 3/1975 | Shun et al. | 235/151.11 |

Primary Examiner—Robert K. Schaefer
Assistant Examiner—John J. Feldhaus
Attorney, Agent, or Firm—Christensen, O'Connor, Garrison & Havelka

[57] ABSTRACT

A circuit for controlling the application of an error compensation circuit in a feedback control system which in turn automatically controls the feedrate of a machine tool apparatus such as a milling machine. Sensors positioned adjacent the spindle of the apparatus measure the amount of force on the spindle under load conditions, and provide an electrical signal output. The electrical signal includes an error component, substantially caused by the revolving mechanial components of the apparatus, such as the spindle, being out of true. If the electrical signal provided by the sensors does not exceed a pre-established threshold voltage, a low-pass compensation filter is applied in the feedback control system, removing the error component but introducing a time constant into the electrical signal and hence a delay in feedback control. If the pre-established threshold voltage is exceeded, however, certain portions of the low-pass filter are bypassed, eliminating the time constant delay and providing a quick feedback control response to large and potentially harmful magnitudes of spindle load.

16 Claims, 9 Drawing Figures

QUICK RESPONSE CIRCUIT FOR CONTROL OF A MACHINE TOOL APPARATUS

BACKGROUND OF THE INVENTION

This invention relates generally to automatic control circuits for machine tool apparatus, and more specifically, is directed toward an improved control system for the feedrate of such machine tool apparatus.

In a machine tool apparatus such as a milling machine, metal or other material removal is accomplished by rotating a cutting tool at a predetermined rate against a workpiece that is moved at a predetermined feedrate relative to the cutting tool. As an example, with particular reference to FIG. 1, a milling machine shown generally at 10 of the conventional horizontal bed mill type includes a longitudinal base 12 upon which are disposed two rails 14. A milling table 16 supports a workpiece 18 and is moved in a longitudinal or X direction along rails 14 by a suitable table motor and gears, not shown, which are housed in a casing 20.

Figure 1:
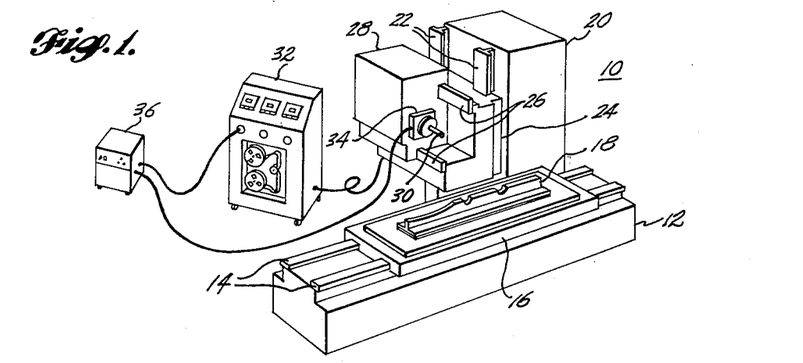
FIG. 1 is a pictorial diagram of a prior art numerically controlled milling machine.

Disposed at right angles to the rails 14 are a pair of rails 22 which may be supported by casing 20. A second table 24 is disposed on rails 22 and is moved in a vertical or Y direction by a second motor and gear arrangement disposed in housing 20. In turn, table 24 has a pair of rails 26 mounted thereon. A cutter mechanism 28 is disposed on rails 26 and is moved in a transverse or Z direction by a third motor and gear arrangement, preferably housed within cutter mechanism 28. Mechanism 28 also houses a fourth motor and gear arrangement which rotates a spindle extending in the Z direction and terminating through various adaptors in a cutting tool 30 which is brought into engagement with the workpiece 18 during the milling process.

With machines of this type, the term "feedrate" can be defined as the rate of movement of the workpiece 18 relative to cutting tool 30 in any of the three coordinate directions, as by movements of tables 18 or 24 or cutter mechanism 28. Recent innovations in the automatic control of milling machines have included a system for automatically controlling the feedrate of a milling machine so as to provide an optimum balance between the minimizing of cutter breakage and wear, and maximum machine productivity. One such system, which is described and claimed in U.S. Pat. No. 3,728,595 to Adams, uses signals generated by a plurality of sensors which are arranged physically around the spindle of the milling machine and which measure its deflection under load. The greater the deflection of the spindle, the greater the load under which it is working, and the greater the chances for breakage and/or excessive wear of the cutting tool. The signal output of the sensors, in terms of voltage, will theoretically correspond to the magnitude of the force being applied to the cutting tool, which signal output is then compared in the numerical control circuitry 36 with pre-established optimum values of cutting tool force. A sensor suitable for such use is described and claimed in U.S. Pat. No. 3,602,090 to Whetham.

Since the feedrate of the workpiece and speed of the cutting tool are thus dependent on the amount of force applied to the spindle, it is an important consideration that the spindle deflection be accurately indicative of the amount of force applied thereto under load. It has been discovered, however, that the amount of such deflection under load is not entirely due to the load force. Rather, a certain amount of spindle deflection is present even when the spindle is rotating under a no load condition. This no load deflection error is referred to and is known generally in the art as "runout" and it typically the result of mechanical imperfections in the various rotating components of the machine.

A typical source of such machine runout is the lack of trueness of the rotating components, in particular the spindle and the spindle bearings. Thus, because the spindle or its bearings or some other rotating mechanical component is not absolutely perfect in its manufactured trueness, a small deflection error, typically both positive and negative, will result during a single revolution of the spindle. This deflection error is inherent in the rotation of the spindle, and is not caused by any force acting upon it. Runout error, furthermore, may be comprised of many components, with each component having a different period. Thus, the runout signal may have a complex waveform. Additionally, due to wear and/or adjustments in the rotating components, the runout error may change slightly over relatively extended periods of time.

It is, of course, undesirable for runout errors to be present in the feedback correction signal because they tend to reduce the productivity of the machine and produce an element of irregularity into the feedrate control signal. The component of the feedback correction signal due to runout error appears, of course, to the numerical control unit as an actual element of deflective force and is accordingly included in the correction of the feedrate.

Several methods known in the art have been used to compensate for the presence of runout components, including a method which samples and reconstructs the runout component, and then feeds the reconstructed signal back into the system in a subtractive manner so as to eliminate its effect. This method, however, requires complex circuitry and is expensive to incorporate into the apparatus.

Another method uses a low-pass filter, which filters out the runout component while leaving the spindle force component, which is DC, to be fed back for control of the feedrate. The filter approach is relatively simple and inexpensive, and generally accepted in the art. However, the use of a low-pass filter introduces a time constant into the response of the feedrate control system. The output of the filter, which is applied as the feedback control signal, is hence delayed relative to the signal at its input. This time delay prevents the immediate application of a corrective control voltage to change the feedrate of the machine when necessary e.g., to immediately slow the feedrate when a particularly difficult section of cutting is encountered. Thus, the delay introduced by the filter may result in excessive wear and possibly breakage of the cutter, because corrective feedback action is not achieved sufficiently quickly.

It is therefore a general object of the present invention to provide a circuit which controls the application of a filtering circuit to the combined deflection signal from the sensors in such a manner as to overcome the disadvantages of the prior art discussed above.

It is another object of th present invention to provide such a circuit which selectively applies filtering to the combined deflection signal, depending upon the magnitude thereof.

It is a further object of the present invention to provide such a circuit in which the combined deflection signal is filtered when the combined deflection signal is relatively small in peak magnitude.

It is yet another object of the present invention to provide such a circuit which eliminates the filter when the deflection of the spindle under load reaches a pre-established value.

It is a still further object of the present invention to provide such a circuit which results in filtered control of the workpiece feedrate when the combined deflection signal is relatively small, but which has a very fast response to those relatively large, immediate changes in deflection force on the spindle which exceed a pre-established value.

SUMMARY OF THE INVENTION

Accordingly, the present invention is useful in an apparatus which includes means for compensating for certain errors generated by the apparatus, wherein the errors are represented in signal form; and wherein the apparatus generates an information signal when it is under a load; the invention including means for establishing a threshold signal level which is greater than the largest excursion of the error signal alone, and a comparator for comparing the level of the threshold signal with the combined levels of the error signal and the information signal. A first output is provided when the threshold level is not exceeded by the combined levels of error and information signals, and a second output is provided when the threshold level is exceeded by the combined levels of the error and information signals. Control means are provided, connected to said compensating means and responsive to said first output to reduce said errors, and responsive to said second output to prevent reduction of said errors.

BRIEF DESCRIPTION OF THE DRAWINGS

A more thorough understanding of the subject matter of the present invention, which is particularly pointed out in the concluding portion of the specification, may be obtained by a study of the following detailed description taken in connection with the accompanying drawings in which.

DESCRIPTION OF THE PREFERRED EMBODIMENT

It should be emphasized initially that, although the preferred use of the invention is in a feedrate control system for a milling machine and is explained, for purposes of clarity, in that context, the principles of the present invention may be useful in many different machine tool applications, and for many varied purposes.

Referring now again to FIG. 1, a milling machine shown generally at 10 is supplied in operation with control signals from a numerical control or N/C unit 32. Numerical control units of this type are well known in the art, and generally comprise digital computer circuits which convert the information existing on a preprogrammed tape into control signals supplied to the milling machine 10. Different milling operations will, of course, require different preprogrammed tapes. Included in the instructions applied to the milling machine may be the desired feedrate of the workpiece in the three coordinate directions during the actual milling process. Such a feedrate control system is described and claimed in U.S. Pat. No. 3,728,595. Automatically controlled feedrate systems typically use the parameter known as milling force, or the force on the spindle during load, to control the machine feedrate. The milling force signal is obtained by sensing, as explained above, the spindle deflection of the apparatus under load, the sensed signal being furnished to a feedrate control unit 36 which in turn supplied a control signal to N/C unit 32 for corresponding control of the feedrate of the workpiece.

Figure 2:
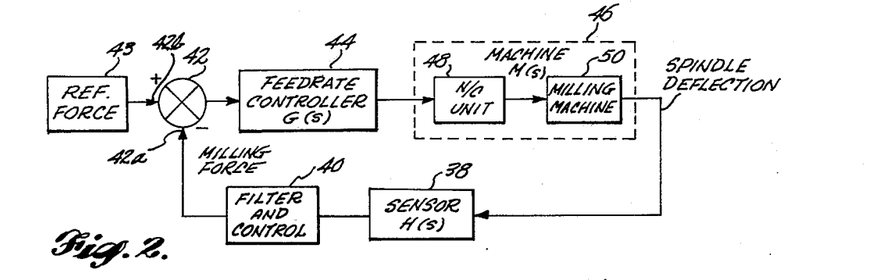
FIG. 2 is a block diagram of a circuit for feedback control of the feedrate of a milling machine which includes the circuit of the present invention.

Referring now to FIG. 2, the system elements of an automatic feedrate control system for a machine, including the filter control system of the present invention, are shown. The deflection of the spindle is sensed by a plurality of sensors in sensor circuit 38, the signal output of which is applied to filter and control circuit 40 of the present invention. The output of the filter and control circuit 40 is the milling force signal which is applied to one port 42a of summing junction 42, with a reference force signal being applied to the other port 42b thereof from reference source 43.

A difference error signal is generated by summing junction 42, equal to the difference between the signal at the respective inputs 42a and 42b, and this error signal is applied to a feedrate controller 44. The output of the feedrate controller 44 is then applied to a milling machine block 46 which comprises an N/C unit 48, and a milling machine 50. In operation, any spindle deflection present in milling machine 50 when the spindle is rotating will be immediately sensed by sensor circuit 38. The milling force from filter and control circuit 40 is compared with a pre-established optimum milling force, and any difference between these two signal is applied through control units 44 and 50 to correspondingly change the speed of the cutter and the feedrate of the workpiece.

Figure 3:
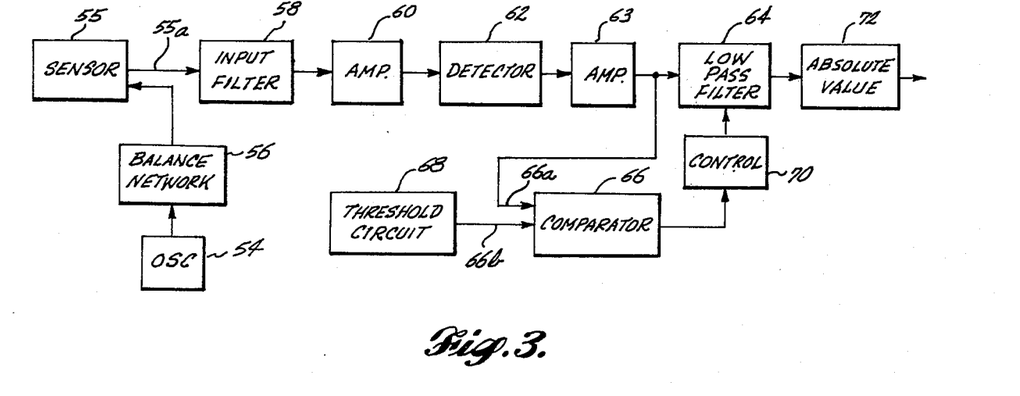
FIG. 3 is a block diagram showing more detail of a portion of FIG. 2 and showing the circuit of the present invention.

Referring now to FIG. 3 for a more detailed block diagram of the feedback control circuit portion of FIG. 2, a combined deflection signal is generated by sensor circuit 55, which represents one pair of sensors, the signal output therefrom being representative of the total deflection of the spindle, and containing both runout and spindle force components. The signal from sensor circuit 55 itself is a 1 kHz signal, supplied by oscillator 54, which signal is modulated by the runout component, with the modulated 1 kHz signal being displaced either positively or negatively from a reference value by the magnitude of the spindle force component. FIG. 5a shows a representative signal from sensor circuit 55 when there is no spindle force component, i.e., under no load conditions. The signal of FIG. 5a varies in magnitude from zero to a maximum value depending upon the magnitude of the runout component. The 1 kHz carrier signal is generated by oscillator 54, the output of which is applied to a balance network 56, the balance network operating to null the signal output from sensor circuit 55 as near as possible to zero volts when the spindle of the apparatus is rotating under no load conditions. The balance network thus can be used to compensate for manufacturing and installation tolerances. The sensor outputs must be so balanced that under rotating no load conditions, the resulting modulated signal output, on line 55a, will be as small as possible. The balance circuit is well known in the art, and is hence not described in schematic detail.

Figure 5:
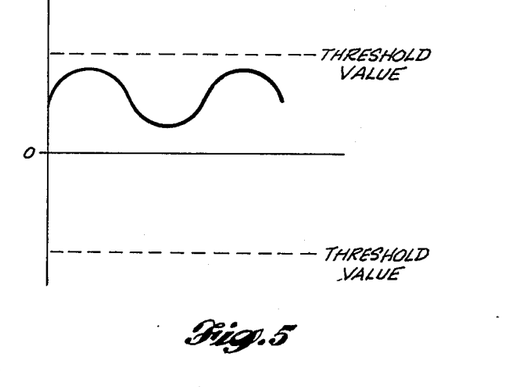
FIGS. 5a through 5e are voltage diagrams showing representative signal waveforms at various points of the circuit of FIG. 3.
Figure 5A:
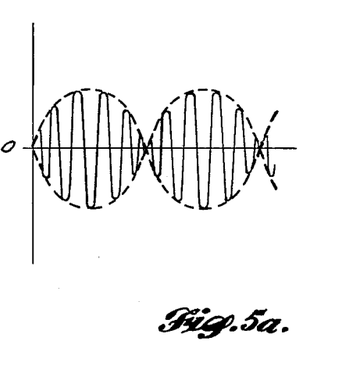
Figure 5B:
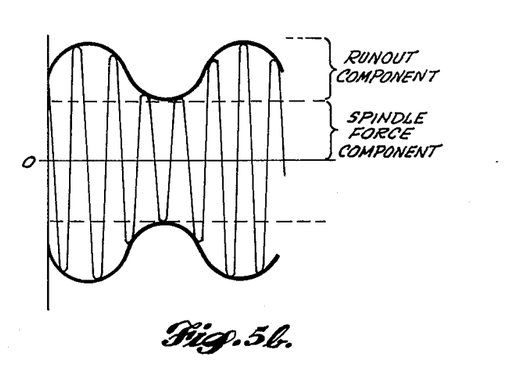

The output of sensor circuit 55 under load conditions is shown in FIG. 5b, wherein the presence of the spindle force component introduces a minimum signal level into the signal of FIG. 5a, the magnitude of the minimum signal level being a function of the magnitude of the spindle face component. The output of sensor circuit 55 is applied on line 55a to filter 58. Input filter 58 is designed to filter out certain undesirable signals which have identifiable frequencies. Typically, input filter 58 is used to eliminate the error signal caused by the magnetization of the spindle of the milling machine. A magnetized spindle generates a magnetic field upon rotation which induces into the sensors a undesirable signal pulse which occurs on a repetitive basis. The input filter is designed to filter out such easily identified error signals.

The output of the input filter 58 is applied in the preferred embodiment to a fixed gain amplifier 60, the gain of which preferably is on the order of 10. The magnitude of the output of amplifier 60 will generally range from 0.03 volts to 0,7 volts.

Figure 5C:
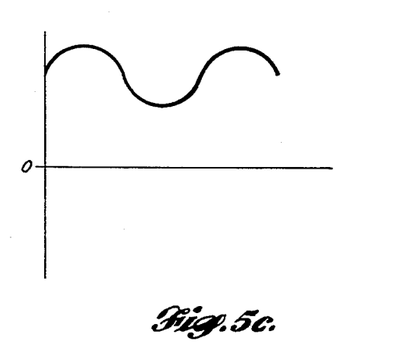

The output of the amplifier 60 is applied to a detector circuit 62, which removes the 1 kHz carrier signal and amplifies the resulting envelope by a factor of 5, resulting in a signal similar to that shown in FIG. 5c, wherein the modulating envelope is minimally offset from a zero reference line by an amount representative of the spindle force component. This offset modulation signal is applied in the preferred embodiment to another amplifier 63, which preferably is a variable gain amplifier, having a gain of between 1 and 20, depending on the tolerances of the spindle and the magnitude of the runout component. The output of amplifier 63 is applied simultaneously to a low-pass filter 64 and to one input 66a of comparator 66. The other input 66b to comparator 66 is supplied by a variable threshold signal circuit 68. The output of variable threshold signal circuit 68 typically is established at a level which is somewhat larger than the peak value of the runout component alone. The signal at the respective inputs 66a and 66b are compared, and any difference signal obtained is supplied as a control signal to control circuit 70 which controls the application of low-pass filter 64 to the composite deflection signal supplied by amplifier 63.

When there is an insufficient spindle force component to result in penetration of the pre-established threshold level, such as shown in FIG. 5d, the output of the comparator 66 is essentially zero, which maintains the control circuit 70 in such a state that the low-pass filter 64 remains in the circuit. Under such a condition, the low-pass filter 64 filters out the runout component of the combined deflection signal supplied by amplifier 63, leaving just the DC signal corresponding to the spindle force component as the output from low-pass filter 64. This DC signal from low-pass filter 64 is applied to an absolute value circuit 72, which functions to provide an output signal which is equal in magnitude to the signal at its input but which does not vary in polarity. The output of the absolute value circuit 72 is representative of one coordinate of the milling force signal, and thus is then summed with signals from substantially identical circuits representing the other coordinates in a vector aumming circuit (not shown) to produce the milling force signal applied to summing junction 42 (FIG. 2).

Figure 5E:
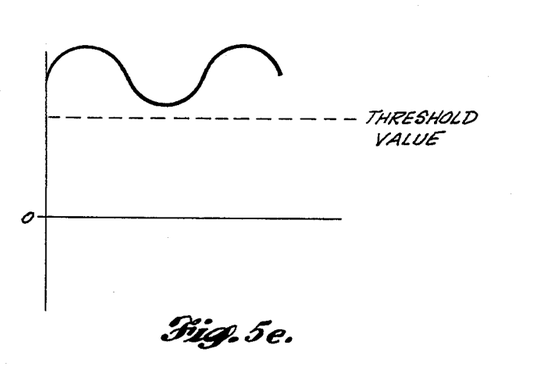

If, however, the combined deflection signal penetrates the threshold level established by threshold circuit 68, such as shown in FIG. 5e and as sensed by comparator 66, the output thereof is a signal which energizes control circuit 70 to remove the low-pass filter 64 from the circuit, thereby permitting the combined deflection signal from amplifier 63 to pass essentially directly to the absolute value circuit 72. This eliminates the time delay caused by low-pass filter 64, and provides a feedback control signal (milling force) to port 42a the summing junction 42 (FIG. 2) almost immediately. The error introduced into the milling force signal applied to port 42a of summing junction 42 by the runout component is tolerated in such instances to permit the feedback control signal to be applied to the machine just as soon as possible, to prevent excessive wear or breakage in the case of sudden increases in spindle force. Thus, depending on the level of the threshold established by threshold circuit 68, which is preferably variable, the low-pass filter 64 is selectively interposed between the amplifier 63 and the absolute value circuit 72, thereby permitting a substantially immediate feedback control signal whenever desirable.

Figure 4:
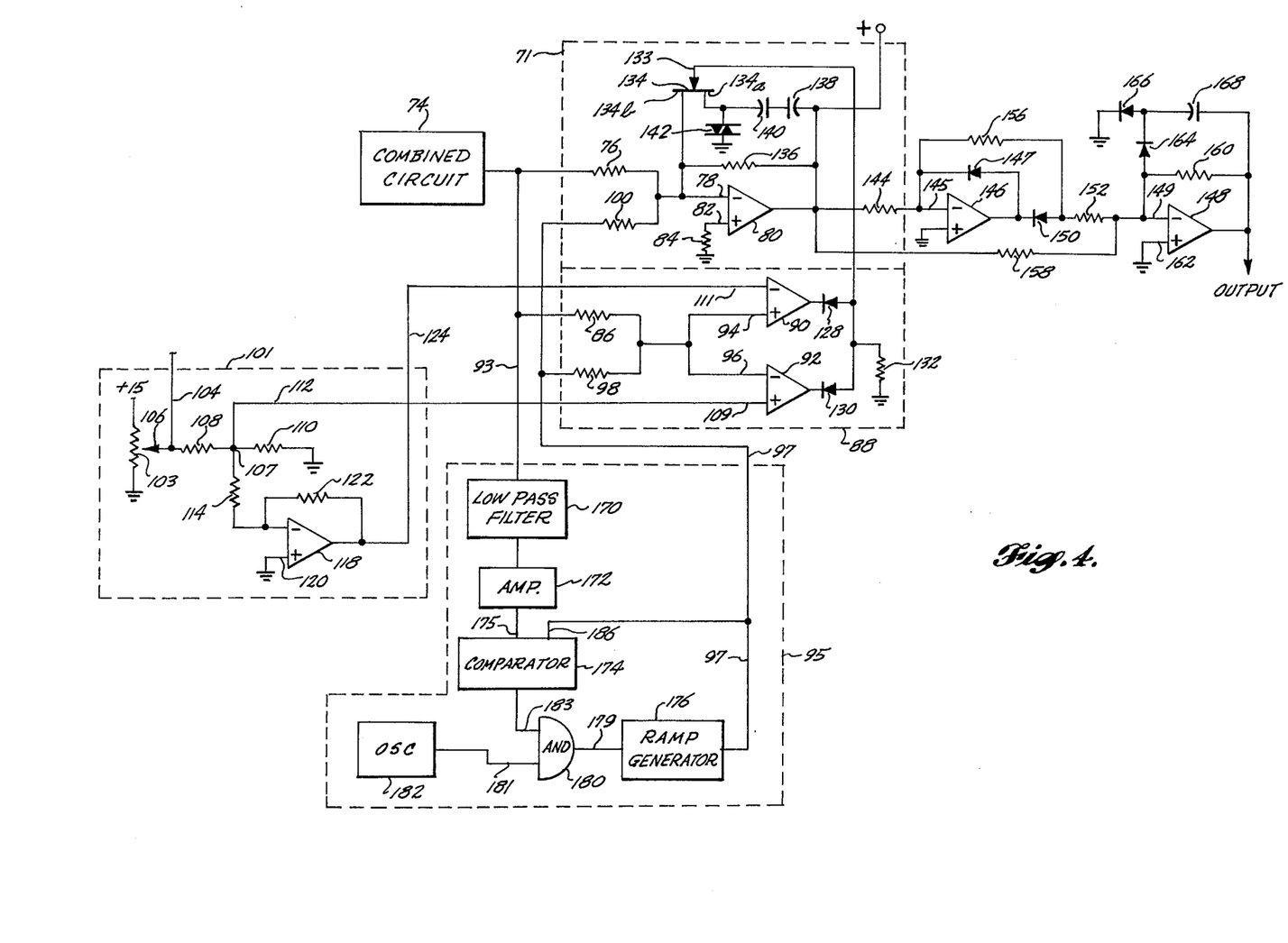
FIG. 4 is a combined block diagram and schematic showing the circuit of the present invention.

Referring now to FIG. 4, which shows portions of the circuitry of FIG. 3 in more detail, the signal generated by the sensing, balancing, amplifying and detecting circuitry shown in FIG. 2, i.e., at the output of amplifier 63, is shown being supplied by circuit 74. The detected composite deflection signal, such as shown in FIG. 5c, provided thereby is applied through resistance 76 to the inverting input 78 of operational amplifier 80 which, with its associated feedback circuits, functions as a low-pass filter. The noninverting input 82 is referenced to ground through resistance 84. Additionally, the combined signal from circuit 74 is applied through resistance 86 to a threshold comparator 88 which comprises two operational amplifiers 90 and 92. The signal from the circuit 74 is applied through resistance 86 to the noninverting input 94 of op. amp. 90 and the inverting input 96 of op. amp. 92. The composite signal from circuit 74 is also supplied on line 93 as an input to an auto-zeroing circuit 95, the output of which is applied on line 97 through resistance 98 to the noninverting input 94 of op. amp. 90 and ithe inverting input 96 of op. amp. 92, thereby being summed at those inputs with the composite signal from circuit 74. The output of the auto-zeroing circuit 95 is also applied on line 97 through resistance 100 to the inverting input 78 of operational amplifier 80, thereby being summed with the combined signal from circuit 74. The structure and operation of the auto-zeroing circuit used in the preferred embodiment will be discussed in more detail in following paragraphs.

The threshold voltages are supplied by a threshold supply 101, which includes a potentiometer 103 connected between ground and a positive 15 volt potential. A monitoring connection 104 is provided on the adjustable wiper 106 of the potentiometer such that the voltage provided at the wiper can be observed. This voltage is applied through resistances 108 and 110, which form a voltage divider, to ground. The midpoint 107 between resistances 108 and 110 is connected via line 112 to the noninverting input 109 of op. amp. 92. Midpoint 107 is also connected through resistance 114 to the inverting input 116 of operational amplifier 118, which has its noninverting input 120 grounded and a resistive negative feedback 122.

The output of operational amplifier 118 is applied on line 124 to the inverting input 111 of operational amplifier 90. Thus, threshold voltages of selected values are established for the threshold comparator 98, for instance, +3/10 volt, is applied as a reference to operational amplifier 92 while −3/10 volt is applied as a reference to operational amplifier 90. The level of the threshold reference voltage is typically somewhat greater than the peak value of the runout component alone. The preferred process for selecting the level of the threshold reference voltage will be more thoroughly discussed in following paragraphs.

In operation, as the spindle of the machine is rotated under load, thereby providing a composite deflection signal of some given magnitude at the output of circuit 74, the positive or negative excursions of the combined deflection signal will at some point initially break through the positive or negative threshold levels. When this occurs, a significant negative output will be provided at one or both of the outputs of operational amplifiers 90 and 92, thereby forward biasing their associated output diodes 128 and 130 which are connected in series with the output of their respective associated operational amplifiers. The cathodes of the diodes 128 and 130 are connected, respectively, directly to the output of the operational amplifiers 90 and 92, while their respective anodes are connected in common with one end of resistance 132, the other end of which is connected to ground.

Additionally, the common anodes of diodes 128 and 130 are applied to a gate connection 133 of FET 134, which gate controls the FET'S operation. FET 134 is part of a complex feedback network arrangement of operational amplifier 80. The feedback network includes a resistance 136 which is connected in negative feedback fashion between the output of operational amplifier 80 and its inverting input 78. The network also includes capacitors 138 and 140, which are connected in series between the output of operational amplifier 80 and one side 134a of FET 134. The other side 134b of FET 134 is connected to the inverting input 78 of op. amp. 80 in standard negative feedback fashion. One end of a varistor 142 is connected between capacitor 140 and side 134a of FET 134, while the other end thereof is connected to ground. The varistor 142 is a nonlinear element which can be simulated by a back-to-back connection of junction diodes, and which functions to maintain the junction of capacitor 140 and the one side 134a of FET 134 at nearly ground potential when FET 134 is off, such that when FET 134 is turned on, large voltage transients are avoided at the output of op. amp. 80.

When output diodes 128 and 130 are both backward biased, indicating that neither the positive or negative excursions of the composite deflection signal from circuit 74 have exceeded the threshold voltage levels established on lines 112 and 124 by threshold supply 101, there will be no output signal provided to FET 134, and FET 134 will then appear as a low value of resistance between capacitor 140 and the inverting input 78 of operational amplifier 80. However, when one or more of the threshold levels is exceeded by the composite deflection signal, an output signal is applied through one or both of diodes 128 and 130, depending on which threshold is penetrated, in the range between −5 and −15 volts, and FET 134 will turn off, appearing as an open circuit, which functionally removes capacitors 138 and 140 from the feedback circuit of operational amplifier 80, leaving just the resistive feedback 136. If capacitors 138 and 140 are functioning in the feedback network of op. amp. 80, as is the case when the threshold levels are not exceeded, the rate of change in response of the output of operational amplifier 80 relative to changes at its input is restricted, providing an integration function.

The magnitude of the time constant delay introduced by the capacitive feedback elements 138 and 140 depends upon the value of the capacitors, and the value of the resistive feedback 136, which in the preferred embodiment, is chosen such that a one second time constant is provided to smooth changes in the input before they reach the output of operational amplifier 80. If however, FET 134 is turned off, indicating that one or the other of the threshold levels have been exceeded, the capacitive feedback network is effectively removed from the circuit, and the combined deflection signal from circuit 74 proceeds directly through op. amp. 80 to following circuitry without any delay.

As noted above, the level of the threshold voltage determines at what point the capacitors 138 and 140 are removed from the feedback path of op. amp. 80. The selection of the threshold level is somewhat arbitrary, and depends to an extent on the intended application of the circuit and the environment in which the device is to operate. In the preferred embodiment, the threshold levels are established as follows: the threshold levels are initially established sufficiently high that FET 134 is "on" all of the time under no load conditions, i.e., when the composite deflection signal comprises only a runout component. The level of the threshold signal is then gradually decreased until it coincides with the peak of the runout component alone. The level of the threshold is then increased by approximately 10%, such that the composite deflection signal must include a spindle force component equal to at least 10% of the composite deflection signal before FET 134 is turned off by the output from op. amps. 90 or 92. Operationally, as the spindle force component increases in magnitude from zero, there will be a short period in which the capacitive feedback of op. amp. 80 is operative and hence the input signal thereto will be integrated, followed by a period in which the capacitive feedback will be rapidly switched in and out by FET 134, due to the cyclical breaking of the threshold level by the varying magnitude composite deflection signal. As the magnitude of the spindle force component increases still more, the composite deflection signal will be entirely beyond the threshold level, and the capacitive feedback will be maintained out of the feedback network.

The output of operational amplifier 80 will be positive or negative, depending upon the direction of deflection of the spindle, i.e., the polarity of the output of op. amp. 80 is meaningful with respect to direction of spindle deflection. However, the polarity of the signal at this point is relatively unimportant, as it is the magnitude of the signal which determines the extent of correction for the machine. Therefore, a circuit for removing the polarity information from the signal at the output of op. amp. 80 is desirable. The output of op. amp. 80 is applied through a coupling resistor 144 to the inverting input 145 of operational amplifier 146. Connected between the output of operational amplifier 146 and its inverting input 145 is a junction diode 147, with the anode of the diode being connected to the output of op. amp. 146 and the cathode of the diode 147 being connected to the inverting input 145.

In series between the output of op. amp. 146 and the inverting input of 149 of operational amplifier 148 are a diode 150 and resistance 152, with the cathode of diode 150 being connected to the output of op. amp. 146, and the resistance 152 being connected between the anode of diode 150, and the inverting input 149 of op. amp. 148. Connected between the anode of diode 150 and the resistance 152 is one end of a resistive feedback circuit 156 for op. amp. 146, the other end of which resistive feedback is connected to the inverting input 145 of operational amplifier 146. Also connected between the output of op. amp. 80 and the junction between resistance 152 and the inverting input 149 of operational amplifier 148 is a resistance 158.

Operational amplifier 148 has a feedback resistance 160 connected between its output and its inverting input 149. The noninverting input 162 of op. amp. 148 is grounded. Operationally, op. amps. 146 and 148, with their associated feedback networks, provide an absolute value of magnitude at the output of operational amplifier 148, regardless of the polarity of the signal output of operational amplifier 80. If the output of operational amplifier 80 tends to go positive, the output of operational amplifier 146 will tend to go negative, thus forward biasing diode 150, and back biasing diode 147. The current through resistance 152 will thus tend to be negative, forward biasing diode 150, and is supplied through resistance 158 and through feedback resistance 160. The feedback current through resistance 160 is caused by a positive voltage at the output of operational amplifier 148. Thus, when a positive voltage appears at the output of operational amplifiers 80, a positive voltage will likewise appear at the output of operational amplifier 148.

If the voltage at the output of operational amplifier 80 tends to go negative, however, the output of operational amplifier 146 will go positive, thereby forward biasing diode 147, and back biasing diode 150. There will thus be no current flow through resistance 152. However, since the potential at the output of operational amplifier 80 is negative, current will flow toward the output of operational amplifier 80 through resistance 158. This current is supplied through feedback resistance 160, the current flowing from the output of op. amp. 148 to the inverting input 149 thereof. Thus, the direction of current flow through feedback resistance 160 is identical in direction regardless of the polarity of the output of operational amplifier 80, and hence, the polarity of the voltage output of operational amplifier 148 remains the same regardless of the polarity of the output of op. amp. 80.

Diodes 164 and 166 and capacitor 168 are provided with op. amp. 148 to smooth out abrupt decreases in the output of op. amp. 148, although sudden increases in its output are still immediately transferred. Diodes 164 and 166 are connected in series between the inverting input 149 of op. amp. 148 and ground. The anode of diode 164 is connected to the inverting input 49, while the cathode of diode 166 is connected to ground. The cathode of diode 164 and the anode of diode 166 are common to one end of capacitor 168, the other end of which is connected to the output of operational amplifier 148. When the output of op. amp. 148 goes positive, capacitor 168 charges, with diode 164 being back biased, thereby isolating the capacitive feedback from the inverting input 149, and with diode 166 being forward biased to ground. However, as the output of op. amp. 148 begins to decline and go back towards zero, diode 164 becomes forward biased and begins to conduct, thereby providing capacitive feedback for op. amp. 148, and resulting in a delay in the output voltage decay of the output of op. amp. 148, the rate of decay depending upon the values of capacitor 168 and the feedback resistance 160.

In practical operation of the machine feedback control circuit, shown in FIG. 2, however, certain DC errors occasionally appear in the composite deflection signal from circuit 74, (FIG. 4) such as result from jarring of the individual machine components, or temperature changes, or long-term changes in the values of the electrical components. This type of error, which should be differentiated from the runout component and the spindle force component, is a DC component, and can be compensated for by a circuit known in the art as an automatic zeroing circuit.

The compensating signal provided by the auto-zero circuit 95 is established as follows. The composite deflection signal from circuit 74 is applied under no load conditions to a low-pass filter 170 which operates to time average the signal applied to its input, and the output which is applied through an amplifier 172 to one input 175 of a comparator 174. The signal at input 175 of cmparator 174 is thus representative of the DC error which is to be compensated for by the operation of the auto-zeroing circuit.

A ramp generator 176 is provided which is initially set to a reference voltage level of −7½ volts, and operates under the control of input pulses on line 179 to provide an output signal on line 97 which increases in 40 millivolt steps between −7½ volts and +7½ volts. The input pulses on line 179 to the ramp generator 176 are supplied by AND gate 180, which has respective inputs 181 and 183 from oscillator 182 and the output of comparator 174. The oscillator 182 operates to enable AND gate 180 at successive intervals of time, as determined by the period of the oscillator 182 output. As long as an output from comparator 174 is present at input 183 of AND gate 180, the output from AND gate 180 will continue to increment the output of ramp generator 176 in given voltage increments, such as 40 millivolts. The output of ramp generator 176 is applied on output line 97 to the other input 186 of comparator 174. Thus, in operation, a continuous comparison is made between the level of DC error established by filter 170 and amplifier 172, and the output of the ramp generator 176 until the output of ramp generator 176 is equal in magnitude to but opposite in polarity to the DC error signal at input 175 of comparator 174.

When such an equality occurs, the output of comparator 174 drops to zero, and the output of the ramp generator 176 stabilizes at that value. The output line 97 from ramp generator 174 is connected through resistance 98 to sum with the composite deflection signal from circuit 74 at the noninverting input 94 of op. amp. 90 and the inverting input 96 of op. amp. 92, and is also connected through resistance 100 to sum with the composite deflection signal from circuit 74 at the inverting input 78 of op. amp. 80. Thus, a DC correction signal equal in magnitude but opposite in polarity to the DC error in the combined deflection signal from circuit 74 is summed therewith both at the input to the low-pass filter 71 and to the threshold comparator 88, thereby effectively canceling the effect of the DC error signal.

It should be recognized by those skilled in the art that various types of sensors, amplifiers, and detectors may be utilized with the circuit of the present invention to provide a combined signal, and that such a circuit has application in a wide variety of machine tool environments and other environments using feedback control loops for correction purposes. Furthermore, it should be recognized that other modifications and changes may be accomplished on the circuit disclosed as the preferred embodiment of the present invention, and hence, that the scope of the invention is to be limited only by the bounds of the claims which follow.

What is claimed is:

1. In an automatically controlled machine tool apparatus using means for compensating for apparatus runout errors, wherein said runout errors are represented in electrical signal form defining a first electrical signal, and are combined with an information signal when the apparatus is under load to define a composite electrical signal, a quick response control system comprising:
   means for establishing a threshold signal level which is greater in magnitude than the largest excursion of said composite electrical signal when the apparatus is not under load;
   means for comparing said threshold level with said composite electrical signal and operative to produce a first output signal when said composite electrical signal does not have an excursion greater in magnitude than said threshold level, and operative to provide a second output signal when said composite electrical signal does have an excursion greater in magnitude than said threshold level; and,
   means operative to enable said compensating means in response to said first signal and to disable said compensating means in response to said second signal.

2. An apparatus of claim 1, wherein said enabling and disabling means is a semiconductor switch having an input and an output, and operative in response to said first signal to present a low resistance path between said input and said output and operative in response to said second signal to present substantially an open electrical circuit between said input and said output.

3. An apparatus of claim 2, wherein said semiconductor switch is an FET.

4. An apparatus of claim 1, wherein said means for generating a threshold signal includes means for generating positive and negative threshold signals of equal absolute magnitude.

5. In an automatically controlled machine tool apparatus using means fofr compensating for apparatus runout errors, wherein said runout errors are represented in electrical signal form defining a first electrical signal, and are combined with an information signal when the apparatus is under load to define a composite electrical signal, the compensating means comprising an operational amplifier having two imputs and an output and with parallel resistive and capacitive negative feedback loops, said composite electrical signal being applied to one input of said operational amplifier, a quick response control system comprising:
   means for establishing a threshold signal level which is greater in magnitude than the largest excursion of said composite electrical signal when the apparatus is not under load;
   means for comparing said threshold signal level with said composite electrical signal and operative to produce a first output signal when said composite electrical signal does not have an excursion greater in magnitude than said threshold signal level, and operative to provide a second output signal when said composite electrical signal does have an excursion greater in magnitude than said threshold signal level; and,
   means operative to enable said compensating means in response to said first signal and to disable said compensating means in response to said second signal, said means comprising a semiconductor switch having an input and an output, and operative in response to said first signal to present a low resistance path between said input and said output and operative in response to said second signal to present substantially an open electrical circuit between said input and said output, said input and output of said semiconductor switch being in series connection in the capacitive feedback loop of said compensating means.

6. An apparatus of claim 5, wherein said capacitive feedback loop includes a series connection of two capacitors, one of said two capacitors being connected to the input of said semiconductor switch, and the other capacitor being connected to the output of said operational amplifier, and wherein said apparatus further includes means common to said input of said semiconductor switch and said one capacitor for maintaining said capacitor at substantially ground potential when said semiconductor switch is off.

7. An apparatus of claim 6, wherein said maintaining means is a varistor.

8. An apparatus of claim 5, wherein said apparatus is a milling machine having a spindle, and capable of automatic feed rate, and wherein said information signal is representative of the force on said spindle when said apparatus is under load.

9. An apparatus of claim 8, wherein said threshold signal has a magnitude which is at least 10 percent above the largest excursion of said runout error alone.

10. An apparatus of claim 8, wherein said information signal has a defined magnitude and wherein said composite electrical signal, upon detection, is an AC signal having a minimum amplitude proportional to the magnitude of said information signal.

11. In an automatically controlled machine tool apparatus using means for compensating for apparatus runout errors, wherein said runout errors are represented in electrical signal form defining a first electrical signal, and are combined with an information signal when the apparatus is under load to define a composite electrical signal, a quick response control system comprising:
   means for establishing positive and negative threshold signal levels of equal absolute magnitude, said means including a source of DC voltage; a potentiometer connected between said source of DC voltage and ground, thereby providing a variable reference voltage; a voltage divider connected to said potentiometer, said voltage divider providing a first threshold signal of preselected magnitude and a first polarity; and a phase reversing amplifier connected to said voltage divider for providing a second threshold signal having said preselected magnitude of polarity opposite to said first polarity;

means for comparing said composite electrical signal with said first and second threshold signals and operative to produce a first output signal when said composite electrical signal does not have an excursion greater in magnitude than said preselected magnitude of said first and second threshold signals, and operative to provide a second output signal when said composite electrical signal does have an excursion greater in magnitude than said preselected magnitudes of said first and second threshold signals; and, means operative to enable said compensating means in response to said first signal and to disable said compensating means in response to said second signal.

12. An apparatus of claim 11, wherein said threshold comparator includes two substantially similar operational amplifiers, each of said comparator operational amplifiers having an inverting input, a noninverting input and an output, each of said comparator operational amplifier outputs being coupled to the output of said compensating operational amplifier, and further including means for applying said positive threshold signal to the noninverting input of one of said comparator operational amplifiers, means applying negative threshold signal to the inverting input of the other of said comparator operational amplifiers, and means applying said composite electrical signal to the inverting input of said one comparator operational amplifier and the noninverting input of said other comparator operational amplifier.

13. An apparatus of claim 12, including means for detecting a DC component of said first electrical signal and means responsive to said DC component for generating a second electrical signal of equal magnitude and opposite polarity to said detected DC component, and further including means applying said second electrical signal to the inverting input of said one comparator operational amplifier and the noninverting input of said other comparator operational amplifier.

14. An apparatus of claim 13, including means for applying said second electrical signal to said compensating operational amplifier with said composite electrical signal.

15. In an apparatus having a feedback loop for control thereof and means controlled by said feedback loop for compensating for apparatus errors, wherein said apparatus errors are represented in electrical signal form and are combined with an information signal to define a composite electrical signal when the apparatus is under load, a quick response system, comprising:

means for establishing a threshold signal level which is greater in magnitude than the largest excursion of said composite electrical signal when the apparatus is not under load;

means for comparing said threshold level with said composite electrical signal and operative to produce a first output signal when said composite electrical signal does not have an excursion greater in magnitude than said threshold level, and operative to provide a second output signal when said composite electrical signal does have an excursion greater in magnitude than said threshold level; and, means operative to enable said compensating means in response to said first signal and to disable said compensating means in response to said second signal.

16. In a closed loop machine tool control system including a milling force sensor providing an output signal representative of the deflection of a spindle of the machine tool under load, circuit means providing a milling force signal from the output signal of the milling force sensor, the circuit means including low pass filter means for filtering out a runout component of the output signal which is representative of spindle runout errors, and control means responsive to the milling force signal for controlling the machine tool, the improvement comprising:

a. a comparator means having first and second inputs and operative to provide a control output signal when the magnitude of a signal applied to said first input exceeds that of a signal applied to said second input;

b. means coupling the output signal of the milling force sensor to said first input of said comparator means;

c. a source of a threshold signal having a magnitude larger than the peak magnitude of the runout component of the output signal of the milling force sensor as coupled to said first input of said comparator means, d. means coupling said threshold signal to said second input of said comparator means, and e. means disabling the low pass filter means in response to said control output signal from said comparator means.

* * * * *